United States Patent [19]

Baker

[11] 4,370,690
[45] Jan. 25, 1983

[54] VACUUM CLEANER CONTROL

[75] Inventor: Daniel A. Baker, St. Louis Park, Minn.

[73] Assignee: Whirlpool Corporation, Benton Harbor, Mich.

[21] Appl. No.: 231,992

[22] Filed: Feb. 6, 1981

[51] Int. Cl.³ .................................... H02H 7/093
[52] U.S. Cl. .................................. 361/23; 15/319; 15/391; 318/463; 361/242
[58] Field of Search ............... 361/23, 239, 242, 33; 15/319, 391; 318/305, 461, 463, 345 H, 345 D; 323/322, 323, 325

[56] References Cited

U.S. PATENT DOCUMENTS

| 2,323,554 | 7/1943 | Mason . | |
|---|---|---|---|
| 2,451,816 | 10/1948 | Dunn | 318/461 |
| 2,467,582 | 4/1949 | Corkran . | |
| 2,472,526 | 6/1949 | Frazee | 318/461 |
| 3,389,321 | 6/1968 | Miller et al. | 318/463 |
| 3,473,101 | 10/1969 | Muskovac | 318/345 H |
| 3,536,977 | 10/1970 | Porter | 318/461 |
| 3,728,604 | 4/1973 | Grygera | 318/463 X |
| 3,845,375 | 10/1974 | Stiebel | 318/463 |
| 3,879,652 | 4/1975 | Billings | 323/322 X |
| 4,025,832 | 5/1977 | Jones | 318/463 X |
| 4,163,999 | 8/1979 | Eaton et al. | 361/23 |
| 4,245,370 | 1/1981 | Baker | 15/319 |
| 4,328,522 | 5/1982 | Tryan | 361/33 |

Primary Examiner—Harry E. Moose, Jr.
Attorney, Agent, or Firm—Wegner, McCord, Wood & Dalton

[57] ABSTRACT

A vacuum cleaner control providing solid state high and low speed electronic control of a vacuum cleaner motor. The control circuit is arranged to terminate operation of the motor in the event the sensed speed of a brush driven by the motor drops below a predetermined low speed as by jamming of the brush. A membrane touch switch panel includes switches which provide manually controlled inputs to the control. In one form, the control uses phase control in setting the low speed operation of the motor and in another form, the control utilizes half wave rectification in setting the low speed motor operation.

14 Claims, 5 Drawing Figures

VACUUM CLEANER CONTROL

BACKGROUND OF THE INVENTION

1. Field of the Invention

This invention relates to vacuum cleaner controls and more specifically to controls for controlling the speed of a vacuum cleaner motor.

2. Description of the Background Art

An improved form of control circuit for use in a vacuum cleaner is disclosed and claimed in co-pending U.S. patent application Ser. No. 1823, of Daniel A. Baker, now U.S. Pat. No. 4,245,370 which application is owned by the assignee hereof. The present invention comprehends a further improved touch switch-actuated control providing high and low speed operation of the vacuum cleaner motor in conjunction with a jammed beater brush sensor.

A number of prior art vacuum cleaner controls have been developed for use in controlling the vacuum cleaner brush motor. Illustratively in U.S. Pat. No. 2,323,554, of Richard D. Mason, a vacuum cleaning apparatus is disclosed wherein a rotor actuated switch and timing means are provided to interrupt the operating circuit of the driving motor of the cleaner a predetermined time interval after movement of the nozzle over the surface undergoing cleaning is arrested. The time interval is made to be long enough to permit stopping of movement of the vacuum cleaner for short intervals without interruption of the operating circuit.

In U.S. Pat. No. 2,451,816 of George B. Dunn, a web break detector utilizes a photoelectric means responding to indicia printed on the web to operate a control to actuate an alarm in response to a breakage of the web. The alarm circuit is arranged to give a visual or audible alarm, as desired, or to automatically disconnect the driving motor of the machine.

Arthur G. Corkran, in U.S. Pat. No. 2,467,582, shows a speed responsive motor control system utilizing a control which is responsive to rotary speed of a device, such as for shutting down the drive motor thereof when the motor speed is reduced to a predetermined number of revolutions per minute. The circuit utilizes an electron discharge tube having a grid on which is impressed a periodic output potential from a transformer so as to render the tube conducting as long as the periodically varied magnetic coupling between the primary and secondary windings of the transformer is sufficiently frequent. The circuit further includes means to delay the dropout of the relay to provide the maintained energization as long as the frequency is at the desired value.

In U.S. Pat. No. 2,472,526, Albert C. Frazee shows an underspeed motor protective system for use in connection with a motor driven conveyor belt. The control utilizes a cam for maintaining energization of a relay.

Robert D. Miller et al., in U.S. Pat. No. 3,389,321, show a frequency sensing detector for stopping a motor upon slowdown. The control includes means to generate electrical pulses at a frequency proportional to the advancement rate of an apparatus with means for receiving the pulses to effect the energization of the motor in response to a predetermined decrease in the frequency of pulse reception.

In U.S. Pat. No. 3,535,977, Virgle E. Porter shows a control circuit for stopping a motor in response to a torque overload. The control circuit senses a preselected drop in the speed of a device by means of a signal produced in each cycle of rotation thereof. If the signal is of both an appropriate duration and amplitude, the control apparatus is actuated. The control includes a rotating disc passing between a stationary magnet and a reed switch so as to open the switch once during each revolution of the disc. The opening and closing of the switch provides a pulse with the frequency of the pulse generation being sensed in the control circuit for controlling the operation of the motor.

James W. Grygera discloses, in U.S. Pat. No. 3,728,604, a motor control system wherein the electromotive force generated by the motor and the motor armature current are sensed on starting and stopping. The control circuit includes a plurality of gates in a flip-flop arrangement.

An electronic rotational sensor is disclosed in U.S. Pat. No. 3,845,375 of Ariel I. Stiebel. The sensor circuit utilizes a light sensing means which is pulsed. The pulses are varied by the rotating apparatus. Charging means in the form of capacitors produce a ramp voltage at a rate proportional to the rate of the apparatus rotation for controlling an SCR.

Emory E. Jones, III, in U.S. Pat. No. 4,025,832, shows an electronic slip detector circuit for use with a conveyor belt. The control includes a magnetic transducer operated by a plurality of magnets rotatable with a conveyor roller and means for converting the sensed pulses produced by the magnets to a DC voltage. When the voltage drops below an adjustable reference, the drive motor is de-energized.

In U.S. Pat. No. 4,163,999, Bradley C. Eaton et al. disclose an upright vacuum cleaner having a brush roller which is belt-driven from a motor. The control includes a magnet in the brush roller and a rotation sensing circuit for generating a pulse for each revolution of the magnet, with a motor shutoff circuit controlled by the sensing circuit to shut off power to the motor when the pulse rate falls below that desired.

SUMMARY OF THE INVENTION

The present invention comprehends an improved vacuum cleaner touch switch-actuated control having a gated electronic switch connected to the motor for controlling energization thereof and means for turning off the switch to terminate operation of the motor when the speed sensed by the brush speed sensing means is below a first preselected speed when the switch means is arranged to cause high speed operation of the motor and to terminate operation of the motor when the speed sensed by the speed sensing means is below a second preselected speed when the switch means is arranged to cause low speed operation of the motor.

The invention comprehends the provision of phase control means for adjusting the circuit means to provide an adjustable low speed operation of the motor and the preselected low speed at which the motor is turned off by the brush sensing means.

In another form, the vacuum cleaner control provides half wave rectification to set the low speed voltage to the motor.

The vacuum cleaner control of the present invention is extremely simple and economical of construction while yet providing improved control of the brush motor.

BRIEF DESCRIPTION OF THE DRAWING

Other features and advantages of the drawing will be apparent from the following description taken in connection with the accompanying drawing wherein.

DESCRIPTION OF THE PREFERRED EMBODIMENTS

Figure 1:
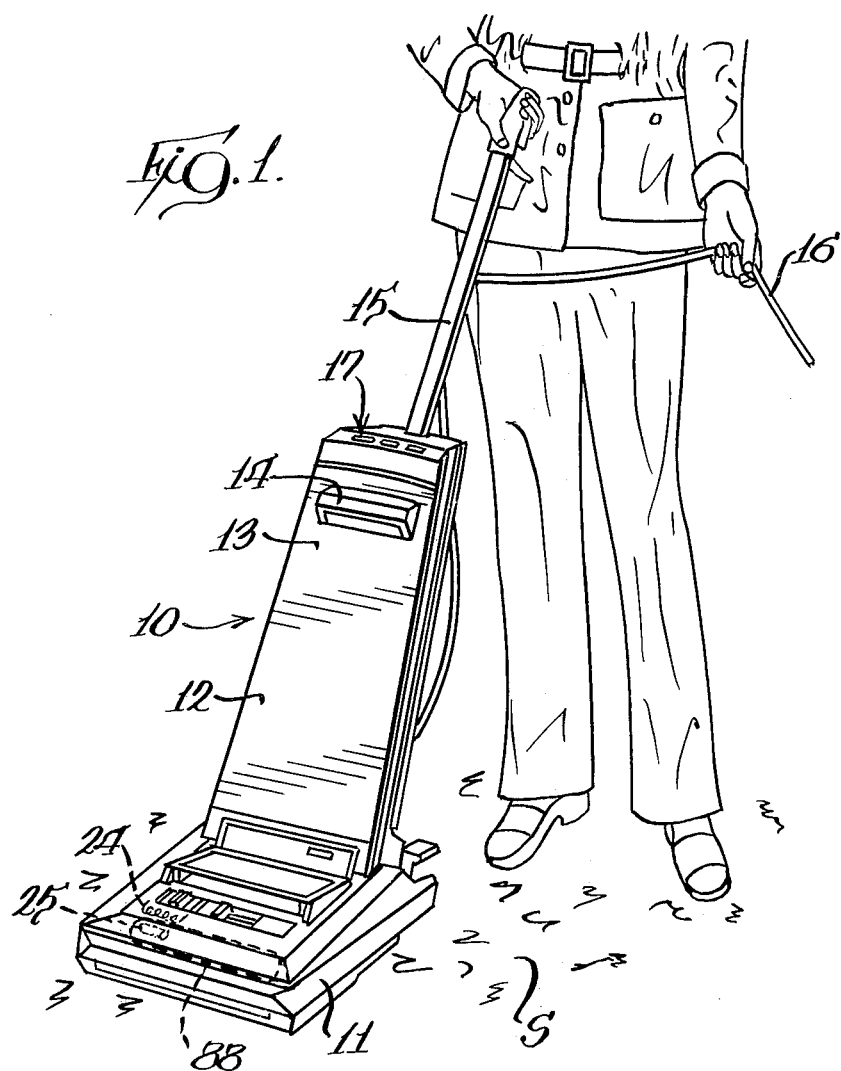
FIG. 1 is a perspective view of an upright vacuum cleaner having a control embodying the invention.
Figure 2:
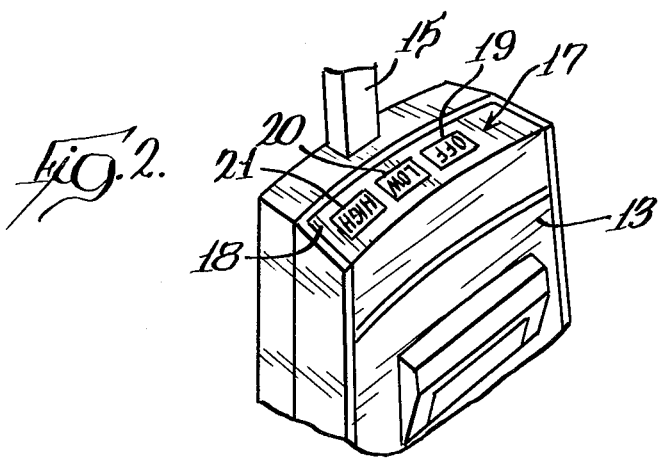
FIG. 2 is a fragmentary perspective view illustrating the arrangement of the touch switch panel and the manual control switches thereof.

In the exemplary embodiment of the invention as disclosed in the drawing, an upright vacuum cleaner generally designated 10 includes a nozzle portion 11 and a dust collecting portion 12. The dust collecting portion may include a movable front wall 13 provided with a handle 14 for providing controlled access to a dust collecting bag (not shown) within the dust collecting portion.

The vacuum cleaner may include a handle 15 for engagement by the user's hand in moving the vacuum cleaner along the surface S to be cleaned. Power to the vacuum cleaner may be provided through a conventional cord 16. The control for the vacuum cleaner includes a membrane touch switch panel including touch switches or manually operable control buttons generally designated 17 provided on the upper end 18 of the dust collecting portion 12, permitting the user to control operation of the vacuum cleaner by means of an "Off" touch switch 19, a "Low" touch switch 20, and a "High" touch switch 21. The touch switches are connected in a control generally designated 22 which responds to the user touching the selected switch pad or button to turn the vacuum cleaner motor 23 off, or selectively to cause low speed or high speed operation thereof as desired.

The speed of the beater brush 88 is sensed by a pick-up coil 24 which may advantageously be fixedly mounted in the nozzle portion 11, responding to rotation of a magnet 25 adjacent the coil. In the illustrated embodiment, the magnet 25 is mounted in the beater brush for rotation directly with the beater brush.

A headlight 26 is connected in parallel with the motor 23.

Figure 3:
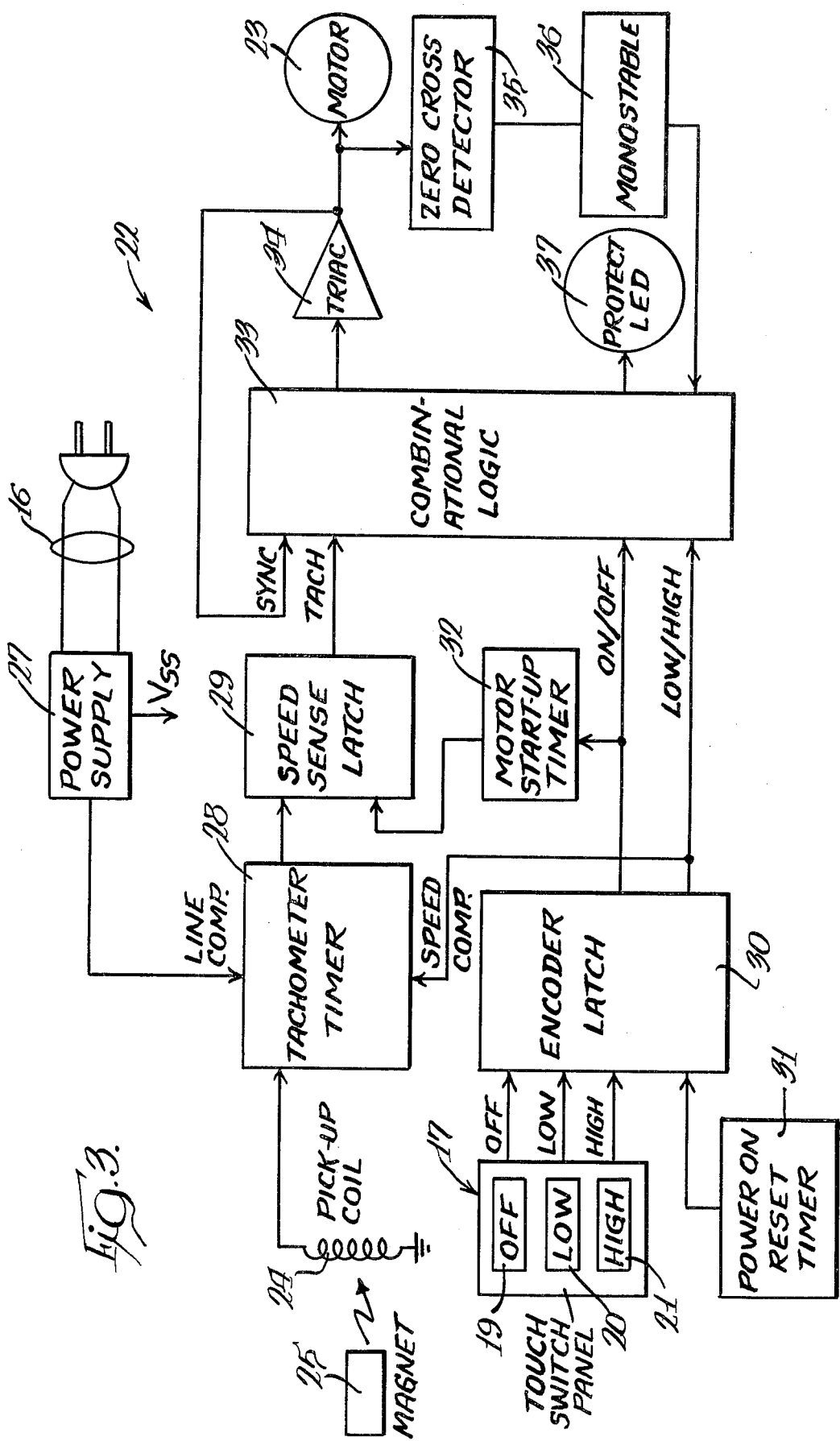
FIG. 3 is a schematic block diagram of the control.

Referring now to FIG. 3, control 22 includes touch switch panel 17, the pick-up coil 24, magnet 25, a power supply 27, a tachometer timer 28, a speed sense latch 29, an encoder latch 30, a power on reset timer 31, a motor start-up timer 32, a combinational logic portion 33, a gated switch 34, a zero cross detector 35, a monostable 36, and a protect LED 37. The gated switch 34 illustratively comprises a triac providing phase control, low speed operation of the motor 23. The control circuit 22 may be formed of complementary metal oxide semiconductor devices, defining integrated circuits for improved low cost construction thereof.

Figure 4:
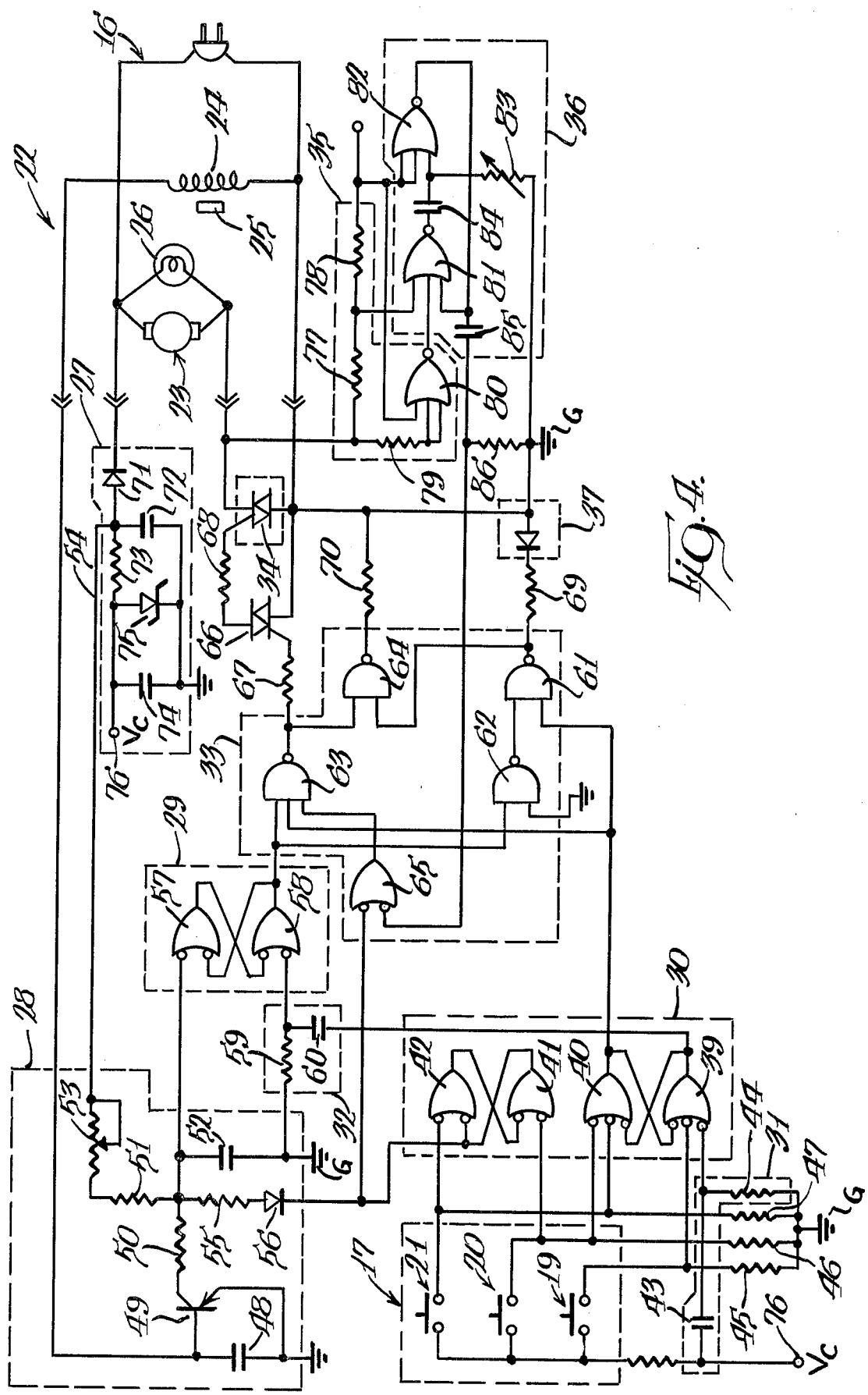
FIG. 4 is a schematic wiring diagram of the control.

Referring now to FIG. 4, the encoder latch circuit 30 includes NAND gates 39, 40, 41 and 42.

The power on reset timer 31 is defined by a capacitor 43 and a resistor 44 forming an RC timer circuit controlling NOR gate 39 to turn the vacuum cleaner unit off when the power cord 16 is plugged in.

Touch switches 19, 20 and 21 are momentary contact, normally open, manually operable switches, and are connected to the NAND gates as shown in FIG. 4. Resistors 45, 46 and 47 are connected to the NAND gates to pull the NAND gate inputs high to ground G when switches 19, 20, 21 are open, as shown in FIG. 4.

Pulses from coil 24 responding to the magnetic pulses from magnet 25 provide a signal to the tachometer timer, and more specifically to a capacitor 48 and transistor 49 thereof. The pulses are amplified by the transistor 49, capacitor 48, and a resistor 50. The speed threshold at which the motor 23 is turned off is determined by a resistor 51, capacitor 52, and variable resistor 53, also included in the tachometer timer circuit 28. Adjustment of resistor 53 varies the threshold speed for shutdown of the motor. Capacitor 52 is connected to ground G and through resistors 51 and 53 to the high voltage line 54 from power supply 27, which illustratively may be approximately $-170$ volts. Thus, the charging rate of capacitor 52 is made proportional to the line voltage, thereby compensating for speed variations due to line voltage variations.

Tachometer timer 28 further includes a resistor 55 and diode 56 which raise the threshold value for the high speed operation of motor 23. In the illustrated embodiment, typical brush speed thresholds are 3200 rpm when the vacuum cleaner is operating at high speed, and 2800 rpm when the vacuum cleaner is operating at low speed.

Speed sense latch 29 includes a NAND gate 57 and a NAND gate 58. When the voltage on capacitor 52 drops below the threshold voltage of the NAND gate 57, latch 29 is set, shutting off the motor 23.

Speed sensing latch 29 is reset by the motor startup timer 32, including a resistor 59 and capacitor 60, and which is activated by the encoder latch 30 when the vacuum cleaner is turned on from "Off" to either "High" or "Low" by touching of the touch switches 20 or 21, respectively. Thus, the speed sense latch is prevented from operating for a period of time determined by the resistor 59 and capacitor 60 after the motor is energized before a low speed brush signal from the tachometer timer is allowed to set the speed sense latch 29 to turn the motor off. In the illustrated embodiment, the motor start-up timer permits the motor to run for approximately one second before the control of the brush sensing means takes over.

The combinational logic circuit 33 includes NAND gate 61, NAND gate 62, NAND gate 63, and NAND gate 64, and NAND gate 65, for determining when the triac 34 and LED 37 should be on. As shown, NAND gate 63 gates a slave triac 66 through a resistor 67 whenever the control is on and the sensing circuit is not controlling the speed sense latch 29. As further shown in FIG. 4, the slave triac 66 gates the motor speed control triac 34 through a resistor 68, which limits the gate current to the triac 34.

LED diode 37 is turned on by the NAND gates 61 and 62 through a resistor 69 when the motor 23 is turned off as a result of the sensing of the low threshold speed of the sensing means.

NAND gate 64 is connected through a resistor 70 to ground G so as to provide a dummy load to keep power dissipation constant in the event neither the LED 37 nor triacs 66 or 34 are on.

The high voltage supply to line 54 is controlled by a diode 71 and capacitor 72 of the power supply 27. As indicated above, line 54 may have a voltage of approximately −170 volts. The power supply 27 further includes resistor 73, capacitor 74, and a Zener diode 75 connected to provide a low voltage power supply of approximately −15 volts to the terminal 76 for powering the integrated circuit components.

Zero crossing detector 35 is defined by resistors 77, 78, and 79 and NOR gate 80. Monostable 36 is defined by NOR gates 81 and 82, variable resistor 83, and capacitors 84 and 85. The monostable 36 controls the phase angle of the firing of triac 34, i.e. how long after the zero crossing detected by circuit 35 the triac 34 is fired and thus provides phase control in setting the speed for the low speed operation of the motor. In the illustrated embodiment, three milliseconds is a nominal firing time. NAND gate 65 synchronizes the output of monostable 35 to the high or low speed selection of the input switches and encoder latch 30. Adjustment of resistor 83 determines the low speed setting for the motor 23. Capacitor 85 cooperates with resistor 86 in establishing the width of the gating pulse applied to triac 34.

In one arrangement of circuit 22, the circuit components had the following characteristics and values.

| Part | Value |
|---|---|
| Gates 41,42,61,62 | MC14011BCP |
| Gates 39,40,63 | MC14023BCP |
| Gates 57,58,64,65 | MC14011BCP |
| Gates 80,81,82 | MC14025BCP |
| Transistor 49 | MPSA70 |
| Triac 66 | L400E5 |
| Triac 34 | TIC246D |
| Diode 56 | IN4148 |
| L.E.D. 37 | MV5754 |
| Diode 71 | IN4007 |
| Zener diode 75 | IN5245 |
| Resistor 45 | 1 Megohm |
| Resistor 46 | 1 Megohm |
| Resistor 47 | 1 Megohm |
| Resistor 44 | 1 Megohm |
| Trimmer resistor 53 | 5 Megohm |
| Resistor 51 | 2.7 Megohm |
| Resistor 55 | 2.7 Megohm |
| Resistor 50 | 3.3 Kilo ohm |
| Resistor 59 | 22 Megohm |
| Resistor 67 | 1.6 Kilo ohm |
| Resistor 70 | 1.8 Kilo ohm |
| Resistor 69 | 1.6 Kilo ohm |
| Resistor 68 | 100 Ohm |
| Resistor 73 | 16 Kilo ohm, 2 watts |
| Resistor 79 | 1 Megohm |
| Resistor 77 | 3 Megohm |
| Resistor 78 | 1.5 Megohm |
| Trimmer Resistor 83 | 560 Kilo ohm |
| Resistor 86 | 1 Megohm |
| Capacitor 43 | .01 Microfarad |
| Capacitor 48 | .05 Microfarad |
| Capacitor 52 | .027 Microfarad |
| Capacitor 60 | .039 Microfarad |
| Capacitor 72 | 20 Microfarad, 200 volts |
| Capacitor 74 | .1 Microfarad |
| Capacitor 84 | .005 Microfarad |
| Capacitor 85 | 100 Picofarad |

Figure 5:
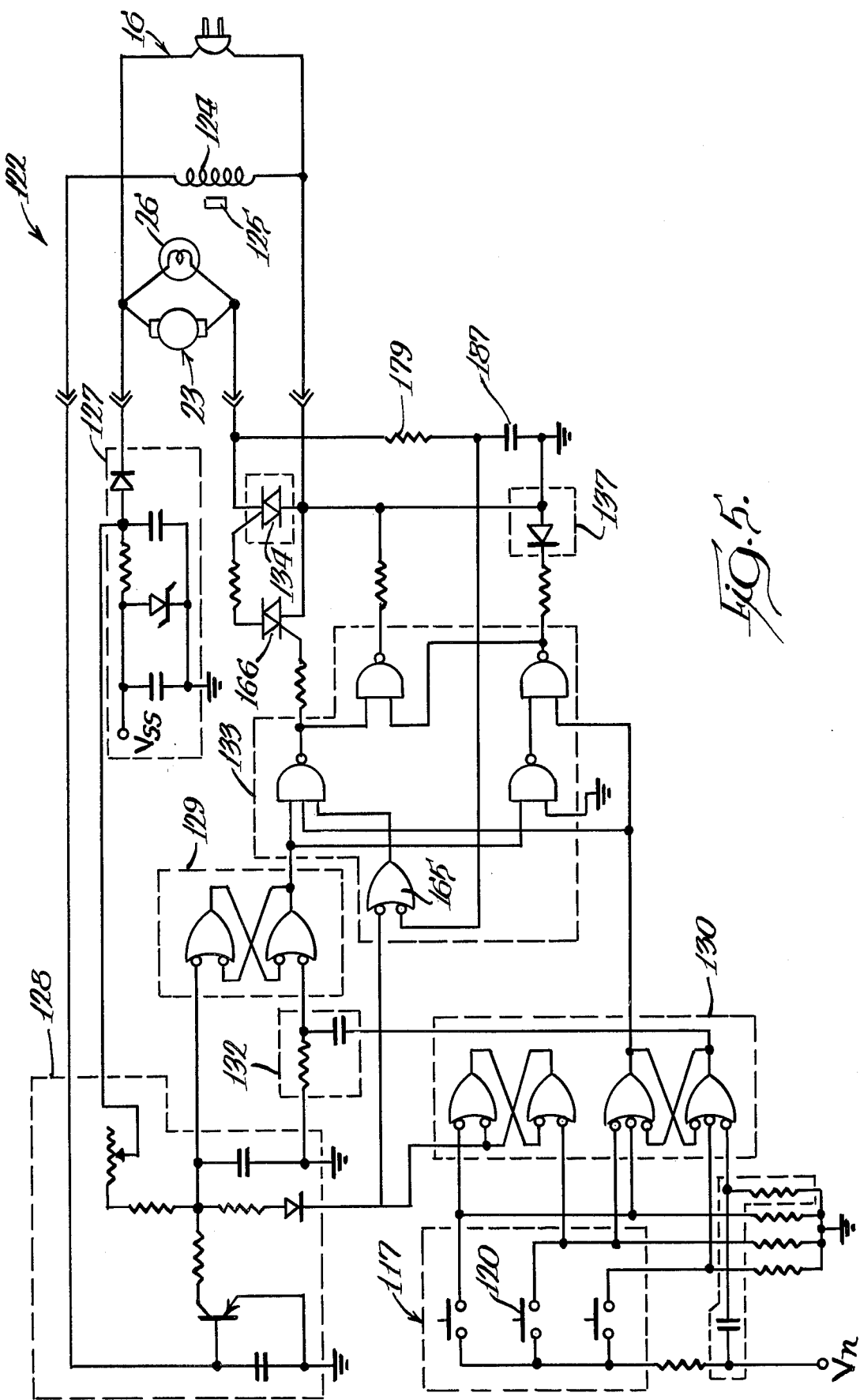
FIG. 5 is a schematic wiring diagram of a modified form of control embodying the invention.

Referring to the embodiment of FIG. 5, a modified control generally designated 122 is shown to comprise a control similar to control 22 but omitting the zero crossing detector 35 and the monostable 36. Control circuit 122 utilizes half wave rectification to set the low speed voltage of the motor 23. This is in contrast to control circuit 22 which utilizes phase control to set the low speed voltage of the motor 23 as described above and as shown in the drawings. In control circuit 122 resistor 179, capacitor 187, and NAND gate 165 cooperate in synchronizing the gating of the slave triac 166 and, thus, triac 134 to the negative half cycles only of the power supply voltage when it is desired to run the motor at half speed as by pressing of the "Low" pushbutton 120. Thus, the low speed of motor 23 is a fixed low speed at the adjustable speed resistor 83 of control 22 is not provided in the control circuit 122.

Control circuit 122 provides the desirable feature of simpler arrangement and, thus, less expense.

Control circuit 122 is similar to control circuit 22 and functions similarly thereto other than for the use of the half wave rectification low speed control, as discussed above. Elements of circuit 122 which are similar to elements of circuit 22 are identified by similar reference numerals, but 100 higher.

In one embodiment of control circuit 122, the resistor 179 had a resistance of 1 Megohm and capacitor 187 had a capacitance of 0.001 Microfarad. The other circuit components were similar.

In use, the operator selects the desired high or low speed operation of the vacuum cleaner by suitably depressing the "High" touch switch 21 or "Low" touch switch 20, as desired. This input is set by the encoder latch 30. A start-up timer 32 permits the motor to get up to speed before sensing the speed of the brush as determined by the pulses generated in coil 124 by the rotating magnet 125. After the predetermined start-up time, the pulses delivered from coil 124 to the tachometer timer circuit control the continued operation of motor 23 so that, in the event the brush speed drops below the threshold speed, motor 23 is turned off by the triac 34 under the control of slave triac 66.

Control circuit 22 permits the low speed operation of the motor to be accurately adjustably set. By use of the phase control of motor 23, any DC component in the motor voltage is eliminated, enhancing the motor life. For a simplified control, however, half wave rectification may be provided by the circuit 122 for controlling the low speed operation of motor 23.

The threshold speed at which the motor 23 is turned off may be adjusted by the adjustable resistor 53.

The foregoing disclosure of specific embodiments is illustrative of the broad inventive concepts comprehended by the invention.

I claim:

1. In a vacuum cleaner having a suction means including an alternating current motor, a rotatable beater brush and drive means for driving the brush as an incident of rotation of said motor, an improved control for controlling the operation of said motor comprising:
   gated electronic switch means connected to the motor for controlling energization thereof;
   touch switch means for selectively controlling the gated switch means to provide a high speed operation thereof and a low speed operation thereof;
   sensing means for sensing the speed of rotation of the beater brush; and
   means for turning off said switch means to terminate operation of the motor when the speed sensed by said sensing means is below a first preselected speed when the gated switch means is arranged to cause high speed operation of the motor, and to terminate operation of the motor when the speed sensed by said sensing means is below a second, lower preselected speed when the gated switch means is arranged to cause low speed operation of the motor, said second preselected speed being caused to be lower than said first preselected speed independently of changes in the voltage conditions of said suction means motor during normal operation thereof.

2. In a vacuum cleaner having a suction means including an alternating current motor, a rotatable beater brush and drive means for driving the brush as an incident of rotation of said motor, an improved control for controlling the operation of said motor comprising:

gated electronic switch means connected to the motor for controlling energization thereof;

first adjustable circuit means including touch switch means for selectively controlling the gated switch means to provide a high speed operation thereof and adjustable low speed operation thereof;

sensing means for sensing the speed of rotation of the beater brush; and second adjustable circuit means for turning off said gated switch means to terminate operation of the motor when the speed sensed by said sensing means is below a first preselected speed when the gated switch means is arranged to cause high speed operation of the motor, and to terminate operation of the motor when the speed sensed by said sensing means is below a second, lower preselected speed when the gated switch means is arranged to cause low speed operation of the motor, said second adjustable circuit means including means for adjusting said preselected speeds, said second preselected speed being caused to be lower than said first preselected speed independently of changes in the voltage conditions of said suction means motor during normal operation thereof.

3. The vacuum cleaner apparatus of claim 1 wherein means are provided for adjusting said last named means to adjust said second preselected speed.

4. The vacuum cleaner apparatus of claims 1 or 2 wherein means are provided for preventing turning off of said gated switch means by said last named means for a preselected period of time after operation of the motor is initiated by said gated switch means.

5. The vacuum cleaner apparatus of claims 1 or 2 wherein said touch switch means comprises a plurality of momentary contact, normally open, manually operable switches.

6. The vacuum cleaner apparatus of claims 1 or 2 wherein means are provided for indicating to the user of the vacuum cleaner the condition wherein said last named means has terminated operation of the motor because of the speed of said brush dropping below the said first preselected speed when the gated switch means is arranged to cause high speed operation of the motor.

7. The vacuum cleaner apparatus of claim 1 wherein means are provided for adjusting said means for selectively controlling the gated switch means to adjust the speed of the motor in the low speed operation thereof.

8. The vacuum cleaner apparatus of claim 1 wherein said first adjustable circuit means includes a manually adjustable electrical control element for adjusting the firing angle of the gated switch means.

9. The vacuum cleaner apparatus of claims 1 or 2 including a manually adjustable electric control element for adjusting the magnitude of the firing angle for said gated switch means to provide phase control for setting the speed for the low speed operation of said motor.

10. In a vacuum cleaner having a suction means including an alternating current motor, a rotatable beater brush and drive means for driving the brush as an incident of rotation of said motor, an improved control for controlling the operation of said motor comprising:

gated electronic switch means connected to the motor for controlling energization thereof;

means for selectively controlling the switch means to provide full wave high speed operation thereof and a half wave low speed operation thereof;

sensing means for sensing the speed of rotation of the beater brush; and means for turning off said switch means to terminate operation of the motor when the speed sensed by said sensing means is below a first preselected speed when the switch means is arranged to cause high speed operation of the motor, and to terminate operation of the motor when the speed sensed by said sensing means is below a second, lower preselected speed when the switch means is arranged to cause low speed operation of the motor, said second preselected speed being caused to be lower than said first preselected speed independently of changes in the voltage conditions of said suction means motor during normal operation thereof.

11. The vacuum cleaner apparatus of claim 10 wherein said control includes manually adjustable means for adjusting said preselected speeds.

12. The vacuum cleaner apparatus of claim 10 wherein said control includes means for latching said gated switch means off in terminating said operation of the motor.

13. The vacuum cleaner apparatus of claim 10 wherein said control includes means for latching said gated switch means off in terminating said operation of the motor, and means for disabling said latching means for a preselected period of time after initiation of operation of the motor.

14. The vacuum cleaner apparatus of claims 1, 2 or 10 wherein said sensing means comprises means for providing an electrical signal having a magnitude proportional to the speed of rotation of said brush, said control includes means for amplifying said signal, and said means for turning off said gated switch means comprises means responsive to the amplified signal.

* * * * *